United States Patent
Amero, Jr. et al.

(10) Patent No.: US 9,106,082 B2
(45) Date of Patent: Aug. 11, 2015

(54) CONNECTOR INTERFACE FOR A CHARGER DEVICE

(75) Inventors: Willard F. Amero, Jr., Flowery Branch, GA (US); Kevin K. Maggert, Lawrenceville, GA (US)

(73) Assignee: Motorola Solutions, Inc., Schaumburg, IL (US)

(*) Notice: Subject to any disclaimer, the term of this patent is extended or adjusted under 35 U.S.C. 154(b) by 928 days.

(21) Appl. No.: 13/281,640

(22) Filed: Oct. 26, 2011

(65) Prior Publication Data

US 2013/0106344 A1 May 2, 2013

(51) Int. Cl.
*H02J 7/00* (2006.01)
*H01R 13/512* (2006.01)

(52) U.S. Cl.
CPC ............ *H02J 7/0042* (2013.01); *H01R 13/512* (2013.01)

(58) Field of Classification Search
CPC ....................................................... Y02E 60/12
USPC ................................................. 320/107, 114
See application file for complete search history.

(56) References Cited

U.S. PATENT DOCUMENTS

| 5,357,185 | A | 10/1994 | Chen |
| 6,994,575 | B1 | 2/2006 | Clark et al. |
| 2004/0229494 | A1* | 11/2004 | Hsu et al. ...................... 439/374 |

FOREIGN PATENT DOCUMENTS

| DE | 10237892 A1 | 3/2004 |
| WO | WO0243191 A1 | 5/2002 |

OTHER PUBLICATIONS

Corresponding PCT Application No. PCT/US2012/057100—International Search Report with Written Opinion—mailing date Mar. 21, 2013.

* cited by examiner

*Primary Examiner* — Edward Tso
*Assistant Examiner* — Ahmed Omar
(74) *Attorney, Agent, or Firm* — Barbara R. Doutre

(57) ABSTRACT

A charger (100) provides a self aligning, compliant connector with multiples degrees of freedom. The charger (100) comprises a housing having an aperture (132) through which a charger connector (110) is mounted via an interior interface formed of convex protrusions (115) and concave recesses (135) that provide a predetermined range of rotational motion and self-alignment for the charger connector (110) within the aperture (132) thereby facilitating mating with a corresponding connector of a radio. Compliant pads (120) apply a compressible force to further control the rotational motion of the charger connector (110).

24 Claims, 5 Drawing Sheets

CONNECTOR INTERFACE FOR A CHARGER DEVICE

FIELD OF THE INVENTION

The present invention relates generally to a charger device and more particularly to a connector for a charging device.

BACKGROUND

Portable two-way radios, such as those used by police and fire departments, rely heavily upon rechargeable batteries and the chargers used in conjunction with these batteries. The batteries utilized to power public safety radios tend to be higher in capacity and thus significantly heavier than batteries used in consumer type radios. A solid electrical connection between mating contacts of the radio and charger is imperative for efficient charging. In most applications, the entire battery operated portable radio is inserted within the charger. Repeated insertion and removal of the radio from the charger can place damaging stresses on the charger's connector. Variation in the angle of insertion can also lead to strain on the charger connector and contacts causing potential damage to input/output pins on the charger and/or the radio itself.

Accordingly, an improved connector for a charger would be highly beneficial.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
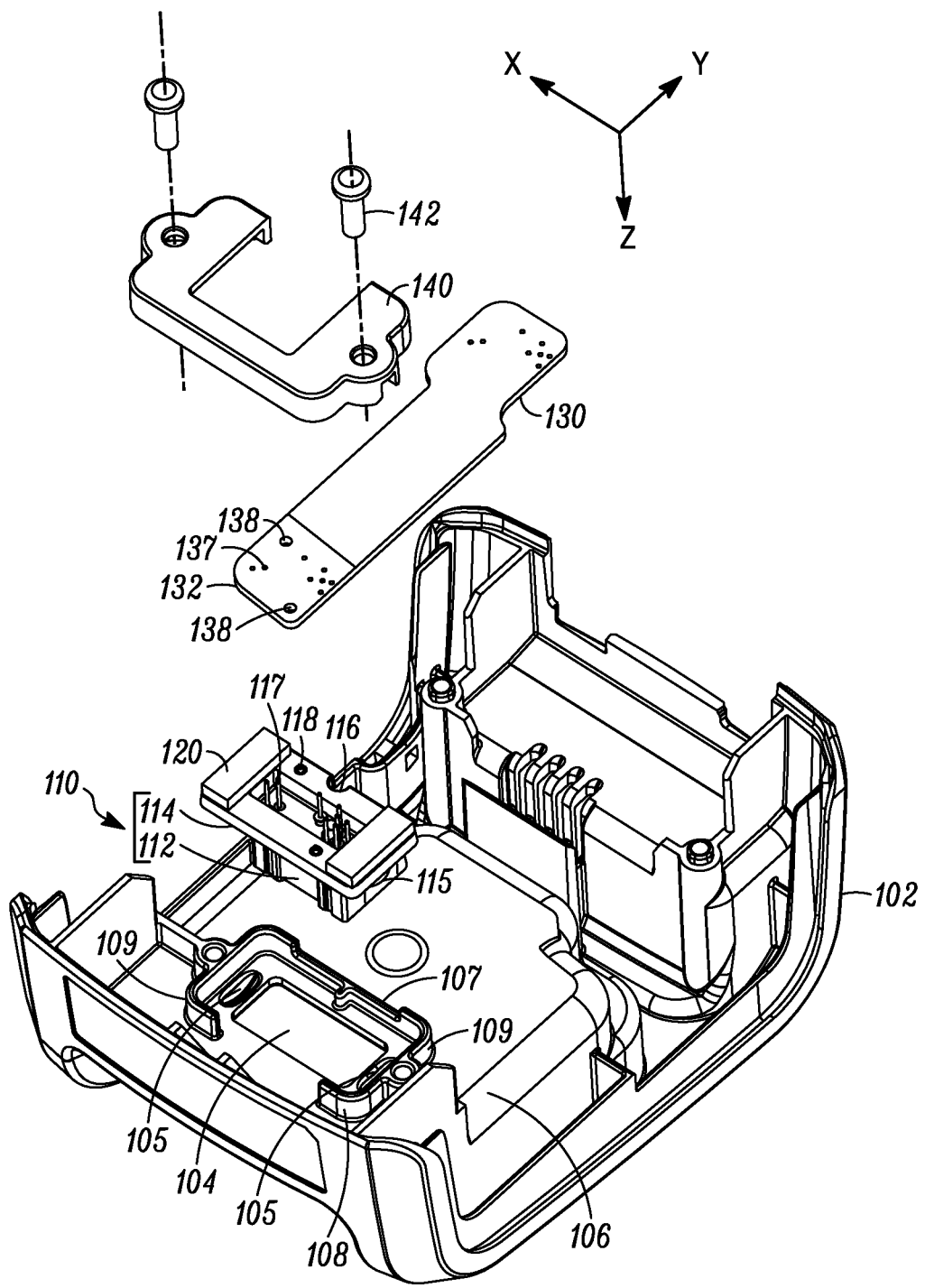
FIG. 1 is an exploded view of a charger device having a connector in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components for a charger device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein a charger having an improved connector interface which permits entry of a portable radio, such as a public safety radio, across various angles of insertion. The charger connector provides a predetermined range of rotation with which to mate to a corresponding connector of the radio.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is an exploded view of a charger 100 in accordance with the various embodiments. The charger 100 comprises a housing 102 which, for ease of illustration and explanation, is shown from an upside down perspective (x, y, z orientation). The housing 102 comprises an aperture 104 formed therein for receiving a charger connector 110 having an interface formed in accordance with the various embodiments. The aperture 104 can be formed within a charger pocket 106 of the housing 102. The interface of charger connector 110 allows for self-alignment and a predetermined range of rotational motion of the charger connector 110 within the assembled charger as will be shown and described in conjunction with subsequent views.

The housing 102 may be formed of rigid plastic or other suitable rigid material. An alignment receptacle 108 is molded within an interior surface of the housing 102. The alignment receptacle 108 comprises sidewalls 109 and, in accordance with the various embodiments, first and second concave recesses 105 formed between the sidewalls 109 and the aperture 104.

The charger connector 110 is formed of a unitarily molded piece part having a connector head 112 for retaining contact pins 117, and a connector base 114 upon which the convex protrusions 115 are molded thereon alongside the connector head. The charger connector 110, in accordance with the various embodiments, comprises first and second convex protrusions 115 for aligning within the first and second concave recesses 105 of the alignment receptacle 108. Contact pins 117 can be seen extending from the connector base 114 for coupling to a power data interface (pdi) substrate 132.

In accordance with the various embodiments, the convex protrusions 115 are formed of crescent shapes which align with corresponding crescent shaped concave recesses 135. In accordance with the various embodiments, the shaping of the convex protrusions 115 and corresponding concave recesses 135 provides a predetermined range of motion for the charger connector 110 to mate with a corresponding connector of another device, such as a radio. Depending on the range of motion desired for a particular application, other shaping configurations may be considered as alternatives.

First and second compliant pads 120 are adhesively coupled to the charger connector 110 and aligned behind the first and second convex protrusions 115 on a bottom surface of the connector base 114. In accordance with the embodiments, the concave recesses 105 aligned within the convex protrusions 115 provide a rotational range of motion for the charger connector 110 within the aperture 104 while the first and second compliant pads 120 provide, under compression, a predetermined force to control the rotation and allow the charger connector 110 to reset to its original position. The first and second compliant pads 120 may be formed of open or closed cell foam, rubber or other suitable gasket type material sufficient to provide a suitable compressive force. Alternatively, a single compliant pad may be used if configured appropriately to back the interface between the convex protrusions 115 and the concave recesses 135 without interfering with the sidewalls 109.

An opening 107 within the sidewalls 109 of the alignment receptacle 108 provides a pass-through for a flex 130 to couple to electronic circuitry of the charger. Alignment nubs 118 can also be molded on the bottom of the connector base 114 to provide alignment to corresponding alignment holes 138 on the pdi substrate 132. Once the pdi substrate 132 is aligned with the charger connector 110, the contact pins 117 of the charger connector mate with corresponding via holes 137 located on the pdi substrate 132. A cut out may be formed within the connector base 114 of the charger connector 110 to provide a reservoir 116 for an adhesive, such as epoxy or other similar adhesive, to seal the flex to the pdi substrate 132.

A backer element 140 couples, for example via screws 142, snaps, tabs, or other interconnect means, against the first and second compliant pads 120 to retain charger connector 110 within the alignment receptacle 108. The backer element 140 may be formed of a rigid plastic material, or similar material that can be molded to enclose the sidewalls 109 of alignment receptacle 108. Alternatively, the backer element can be made of a flat, printed circuit board (pcb) material without enclosing the sidewalls 109. By coupling the backer element 140 to the alignment receptacle 108, the backer element presses against the compliant pads 120 so that the convex protrusions 115 on the connector base 114 of the charger connector 110 are pushed into and retained within the concave recesses 105 of the alignment receptacle 108.

Figure 2:
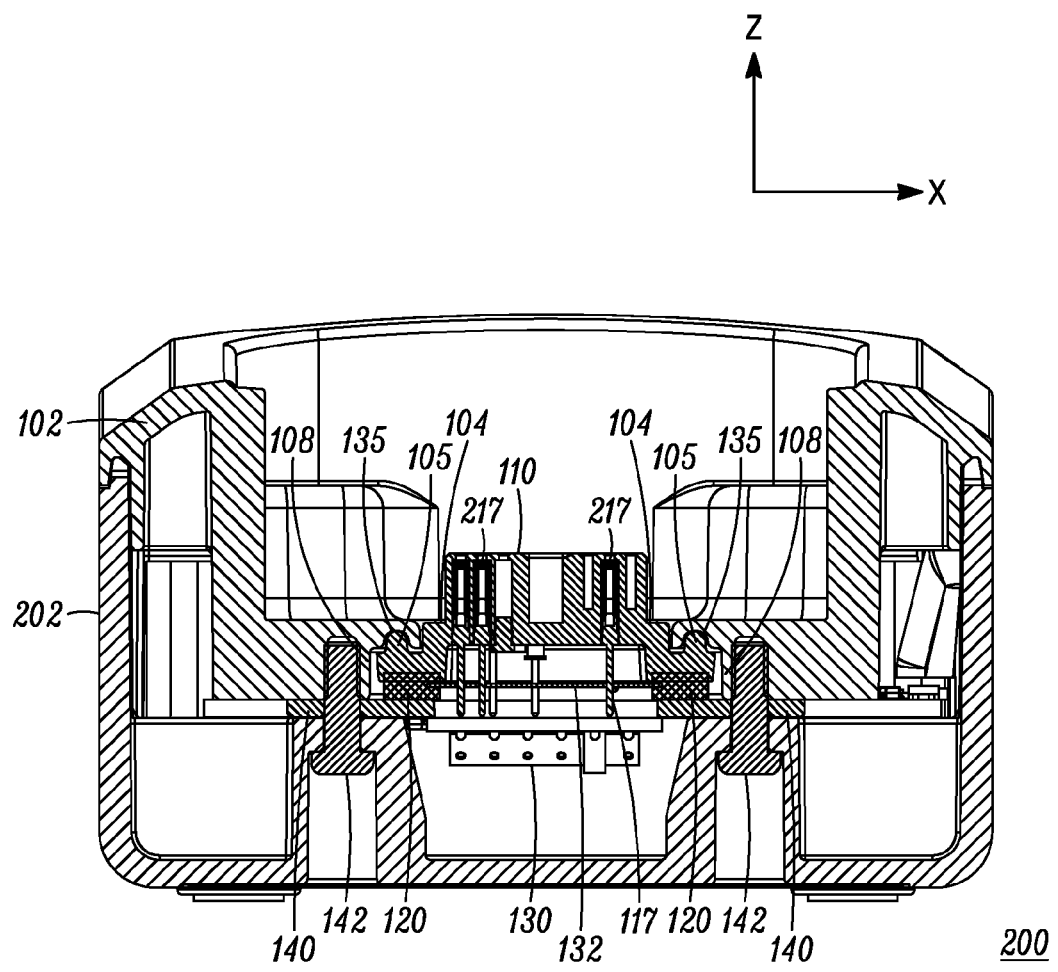
FIG. 2 is a cross sectional front view of the assembled charger, cut along a center of the charger connector, in accordance with the various embodiments.

FIG. 2 is cross sectional front view 200 of the assembled charger 100 in accordance with the various embodiments. This view is cut along the center of the charger connector 110. In this view the charger 100 is shown in its upright position, and housing 102 is coupled to a base housing 202. In this view, the charger connector 110 is shown aligned within the alignment receptacle 108 and protruding through aperture 104.

Again, the charger connector 110 is formed of a unitarily molded piece part having connector head 112 and connector base 114. The connector head 112 holds the contact pins 117 corresponding to sockets 217. The connector base 114 has the convex protrusions 115 molded thereon alongside the connector head 112, on opposing sides of an upper surface of the base connector 110. Each convex protrusion 115 aligns within its respective concave recess 105 thereby providing self-alignment for the charger connector 110. The charger connector 110 itself has no screws, and as such the convex protrusions 115 seated within respective concave recesses 105 provide for a predetermined range of rotational motion in addition to self-alignment.

This view further shows the power data interface (pdi) substrate 132 of flex 130 coupled to the contact pins 117. Flex 130 couples to electronic circuitry of a printed circuit board (not shown) within the charger 102. The first and second compliant pads 120 are coupled to the charger connector 110 and beneath the first and second convex protrusions 115 on either side of the pdi substrate 132. Again, the charger connector 110 is formed of a unitarily molded piece part having connector head 112 and connector base 114. The connector head 112 holds the contact pins 117 and corresponding sockets 217. The connector base 114 has the convex protrusions 115 molded thereon alongside the connector head 112, on opposing sides of an upper surface of the base connector 110.

The backer element 140 is coupled, via screws 142 or other means, against the first and second compliant pads 120 to retain charger connector 110 within the alignment receptacle 108. The concave recesses 105 aligned within the convex protrusions 115 provide a rotational range of motion for the charger connector 110 within the aperture 104. The first and second pads provide, under compression, a predetermined force to control the rotation and allow reset of the charger connector 110 to its original position.

Figure 3:
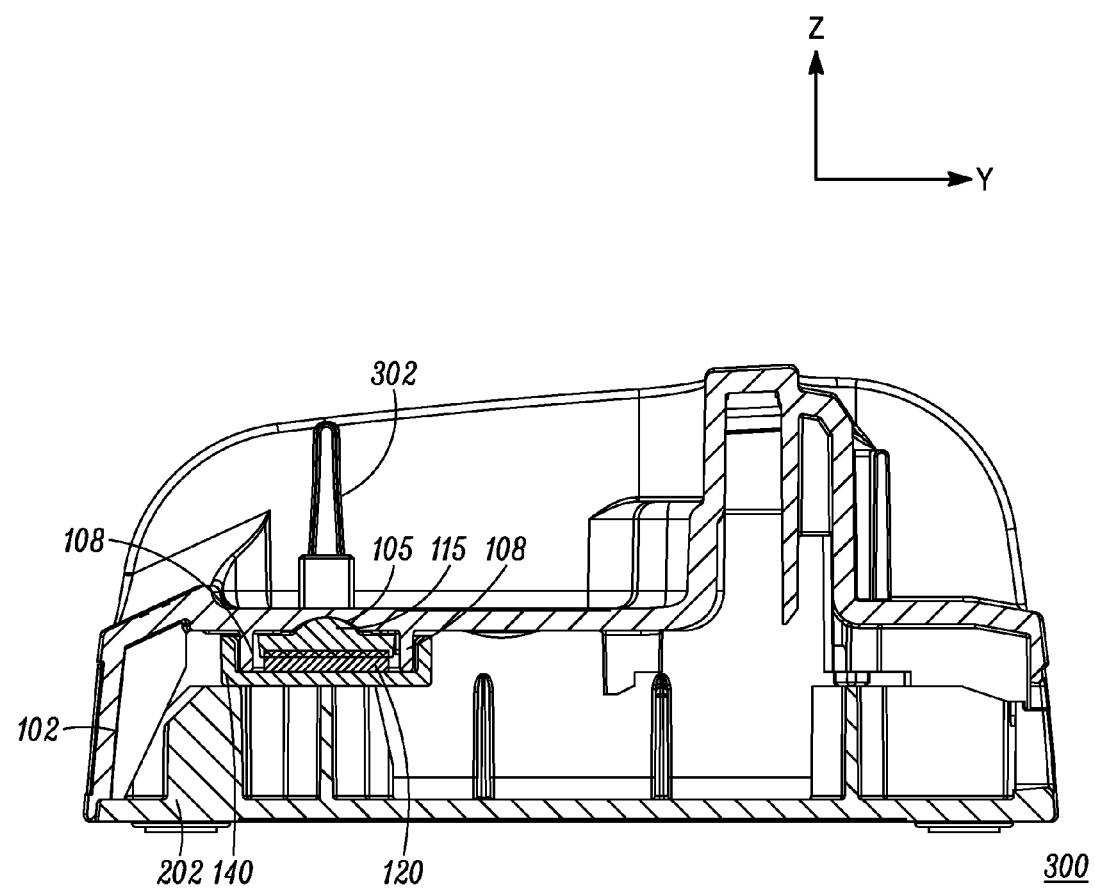
FIG. 3 is a cross sectional side view of the assembled charger, cut along an interface of a convex protrusion and concave recess in accordance with the various embodiments.

FIG. 3 is a cross sectional side view 300 of the assembled charger 100 in accordance with the various embodiments. This view is cut along the interface of one of the convex protrusions 115 and corresponding concave recesses 105. The backer element 140 presses against the compliant pad 120 so that the convex protrusion 115 is pushed into and retained within the concave recess 105 of alignment receptacle 108. This view further shows one of two alignment ribs 302 which may be formed within charger pocket 106 of the charger housing 102. The alignment ribs 302 can be used to provide initial alignment of a radio into the charger pocket 106.

To provide controlled motion of the charger connector 110, the convex protrusions 115 are preferably formed of flat crescent shapes and the concave recesses 105 of corresponding crescent shaped recesses. This crescent shaping permits the charger connector 110 to pivot back and forth in multiple directions. For the crescent shaped embodiment, the pivoting action occurs primarily in they direction, secondarily in the x direction and/or as a combination between Y and X or multiple planes. For example, 80 to 100 degrees of rotation in the y-z plane may be desirable for a charger application, while other applications may have looser or tighter application needs. For additional range of motion, full dome shaped protrusions and saucer shaped recesses can be used rather than crescent shaped. This alternative shaping allows more side to side movement in addition to front to back movement, permitting increased motion across multiple planes. As another alternative, the location of the convex protrusions 115 and convex recesses 105 may be swapped such that the convex protrusions 115 are located on the charger connector 110 and the concave recesses 105 are located within the alignment receptacle 108 of the housing 102.

The selection of shaping is dependent on how much play is desired for the charger connector 110. The shaping of the recesses and protrusions along with the use of a compliant pad or pads, aperture size and alignment ribs operate to control the amount of rotational movement of charger connector 110.

Figure 4:
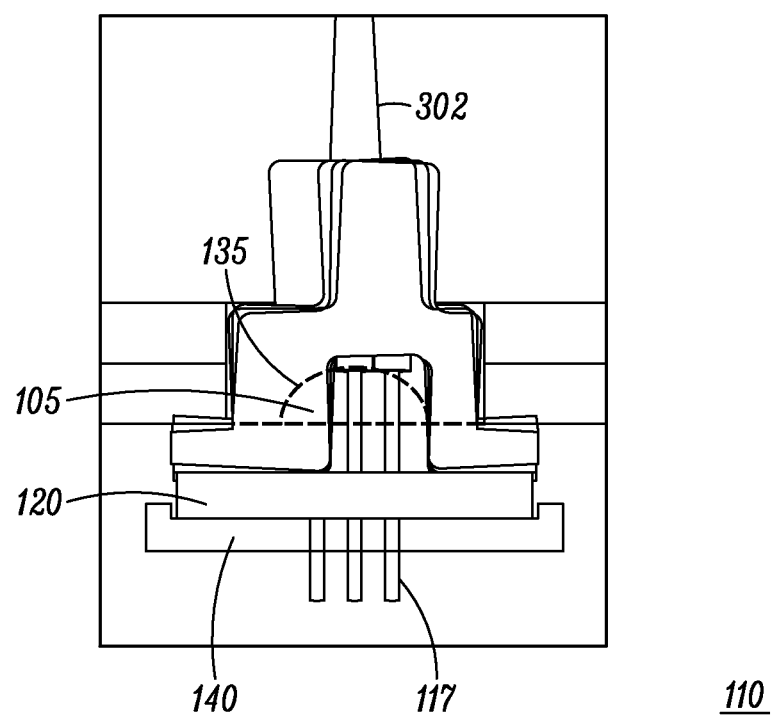
FIG. 4 is diagram illustrating an example of rotational movement of the charger connector in accordance with the various embodiments.

FIG. 4 is a diagram illustrating an example of rotational movement 400 of the charger connector 110 in accordance with the various embodiments. The connector head 112 protruding through the aperture 104 has a rotational range of motion provided by the interface between the convex protrusions 115 and concave recesses 105. The backer element 140 presses the compliant pads 120 to maintain compressive forces and coupling of the convex protrusions 115 into the concave recesses 105 while still permitting the rocking motion to take place. Thus, the convex protrusions 115 pivot, or rock, within the concave recesses 105 in a very controlled reliable manner.

Figure 5:
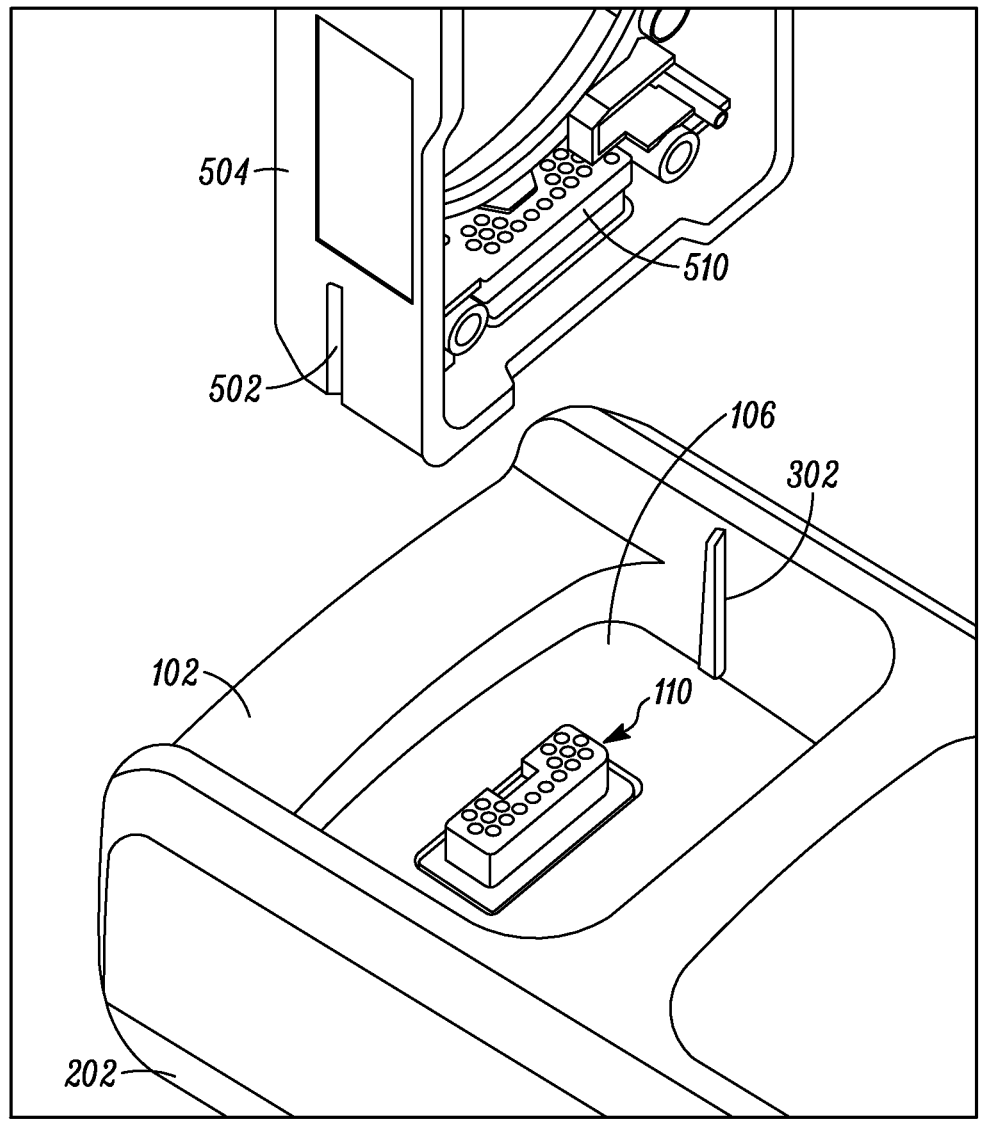
FIG. 5 is an assembled view of the charger with charger connector for receiving and mating with a radio in accordance with the various embodiments.

FIG. 5 is an assembled view 500 of the charger 100 with charger connector 110 for receiving and mating with a radio 504 in accordance with the various embodiments. Charger 100 comprises housing 102 having charger pocket 106 for receiving the radio 504. The charger connector 110 is mounted within the charger pocket 106 via an interface formed of convex protrusions and concave recesses, as previously described, that provide a predetermined range of rotational motion for the charger connector to mate with a corresponding radio connector 510 of the radio 504.

In accordance with the various embodiments, the convex protrusions 115 may be located on the charger connector 110, and the concave recesses 135 may be formed on an interior surface of the housing 102. Alternatively, the concave recesses 135 may be located on the charger connector 110, and the convex protrusions 115 may be formed on an interior surface of the housing 102. Either way, both alignment and the predetermined range of rotation of the charger connector 110 is controlled by the convex protrusions 115 rocking, or pivoting, within the corresponding concave recesses 135. The cushioning provided by the compliant pads 120 further controls the movement of the charger connector 110 within the alignment receptacle 108. Upon insertion of the radio/battery 504 into the charger 100, the compliant pads 120 compress to apply a predetermined force to control rotation of the charger connector 110. After extraction of the radio/battery 504 from the charger 100, the compliant pads 120 decompress and allow the charger connector 110 to reset to its original position. Thus, the assembled charger 100 provides a self-aligned, compliant charger connector.

As shown in FIG. 5, the charger pocket 106 may further comprise alignment ribs 302 for aligning with corresponding slots 502 of the radio 504. Upon insertion of the radio 504 into the charger pocket 106, the guide ribs 302 provide an initial alignment of the radio within the charger pocket 106.

The additional range of motion provided by the charger connector 110 allows for a more rugged and insertion-tolerant interface for the radio connector 510. The radio-to-charger interface provided by charger connector 110 is far more reliable than that of the rib/slot interface alone. The self aligning, compliant connector provides multiples degrees of freedom for radio insertion. The radio 504 may be inserted into the charger 110 at different angles and with different forces reliably and easily without damaging charger connector 110. Thus, misalignment can now be further tolerated as the stresses on the interconnect interface have been reduced. Repeated insertion and removal of the radio/battery 504 from the charger 100 is now possible without damaging stresses occurring on the charger's connector 110.

The charger 100 may be a desktop charger, vehicular charger, or the like. The charger 100 may include one or several pockets to provide for single unit or multi-unit charging.

Accordingly, there has been provided a connector interface for a charger connector 110 to mount via an interior interface formed of convex protrusions 115 and concave recesses 105 that provide a predetermined range of rotation for the charger connector within the aperture to facilitate mating with a connector of a radio.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A charger, comprising:
a housing having an aperture;
a charger connector, extending through the aperture, the charger connector having first and second convex protrusions;
an alignment receptacle formed within an interior surface of the housing, the alignment receptacle having sidewalls and first and second concave recesses formed between the sidewalls and the aperture, the first and second convex protrusions of the charger connector aligning within the first and second concave recesses of the alignment receptacle;
first and second compliant pads coupled to the charger connector and aligned behind the first and second convex protrusions; and
a backer element coupled against the first and second compliant pads to retain charger connector within the alignment receptacle.

2. The charger of claim 1, wherein the first and second concave recesses aligned within the first and second convex protrusions provide a rotational range of motion for the charger connector within the aperture of the housing, and the first and second compliant pads provide, under compression, a predetermined force to control the rotational range of motion and allow reset of the charger connector.

3. The charger of claim 1, wherein the charger connector is a unitarily molded piece part.

4. The charger of claim 1, wherein the first and second convex protrusions aligning within the first and second concave recesses of the alignment receptacle provide self-alignment of the charger connector within the alignment receptacle.

5. The charger of claim 1, wherein the first and second concave recesses and first and second convex are formed of crescent shapes permitting rotation in multiple planes.

6. The charger of claim 1, wherein the first and second concave recesses are formed of saucer shaped recesses, and the first and second convex protrusions are formed of corresponding dome shaped protrusions permitting rotation in multiple planes.

7. The charger of claim 1, wherein the charger connector is a unitarily molded piece part having a connector head and a connector base, the first and second convex protrusions being formed on the connector base alongside the connector head.

8. The charger of claim 1, further comprising:
a power data interface (pdi) substrate coupled to the charger connector.

9. The charger of claim 8, further comprising:
a flex coupled to pdi substrate; and
an opening within the sidewalls of the alignment receptacle, the opening providing a pass-through for the flex to couple to electronic circuitry of the charger.

10. The charger of claim 9, further comprising:
a plurality of alignment holes on the pdi substrate; and
alignment nubs molded on the charger connector to align with to the plurality of alignment holes on the pdi substrate.

11. The charger of claim 9, further comprising:
a reservoir formed of a cut-out within the charger connector for receiving an adhesive for sealing the pdi substrate to the charger connector.

12. A charger for a radio, comprising:
a housing having a charger pocket for receiving the radio;
a charger connector mounted within the charger pocket via an interior interface formed of convex protrusions and corresponding concave recesses, the convex protrusions and corresponding concave recesses providing a predetermined range of motion for the charger connector to mate with a corresponding connector of the radio;
an alignment receptacle formed within the housing for receiving the charger connector;
a compliant pad mounted to the charger connector; and
a backer element pressing against the compliant pad thereby retaining the convex protrusions within the corresponding concave recesses.

13. The charger of claim 12, wherein the convex protrusions are formed on the charger connector, and the corresponding concave recesses are formed on an interior surface of the housing; and
the predetermined range of motion of the charger connector is controlled by the convex protrusions rocking within concave recesses.

14. The charger of claim 12, wherein the convex protrusions are formed on an interior surface of the housing, and the corresponding concave recesses are formed on the charger connector; and
the predetermined range of motion of the charger connector is controlled by the convex protrusions rocking within concave recesses.

15. The charger of claim 12, wherein the charger connector is a unitarily molded piece part upon which are molded the convex protrusions or concave recesses which receive corresponding convex protrusions or corresponding concave recesses molded within an interior surface of the housing to provide self-alignment along with multiple degrees of rotational freedom.

16. The charger of claim 12, wherein the convex protrusions are formed on the charger connector, and the corresponding concave recesses are formed on an interior surface of the housing within the alignment receptacle.

17. The charger of claim 12, wherein the compliant pad, under compression, provides a predetermined force to control the predetermined range of motion, and the compliant pad, under decompression, resets the charger connector to its original position.

18. The charger of claim 17, wherein the compliant pad is adhesively coupled to the charger connector beneath the convex protrusions and corresponding concave recesses.

19. The charger of claim 12, wherein the charger pocket includes alignment ribs for aligning with corresponding slots of the radio.

20. A charger connector interface, comprising:
a housing having an aperture through which a charger connector is mounted via an interior interface; and
the interior interface is formed of convex protrusions and corresponding concave recesses that provide self-alignment of the charger connector within the housing along with a predetermined range of rotational motion for the charger connector within the aperture;
an alignment receptacle formed within the housing for receiving the charger connector;
a compliant pad mounted to the charger connector; and
a backer element pressing against the compliant pad thereby retaining the convex protrusions within the corresponding concave recesses.

21. The charger of claim 1, wherein cushioning provided by the first and second compliant pads controls movement of the charger connector within the alignment receptacle that facilitates insertion of a radio into the charger at different angles and with different forces without damaging the charger connector.

22. The charger of claim 1, wherein the first and second compliant pads are formed of a gasket type material to provide a compressive force.

23. The charger of claim 12, wherein cushioning provided by the compliant pad controls movement of the charger connector within the alignment receptacle that facilitates insertion of the radio into the charger at different angles and with different forces without damaging the charger connector.

24. The charger of claim 12, wherein the compliant pad is formed of a gasket type material to provide a compressive force.

* * * * *